| United States Patent [19] | [11] Patent Number: 4,920,184 |
|---|---|
| Schäfer et al. | [45] Date of Patent: Apr. 24, 1990 |

[54] HYDROPHILIC SILICONE RUBBER ARTICLE AND PROCESS FOR ITS PREPARATION

[75] Inventors: Horst Schäfer, Aschaffenburg; Gerhard Kossmehl, Berlin; Walter Neumann, Königsbronn, all of Fed. Rep. of Germany

[73] Assignee: Ciba-Geigy Corporation, Ardsley, N.Y.

[21] Appl. No.: 228,867

[22] Filed: Aug. 5, 1988

Related U.S. Application Data

[63] Continuation of Ser. No. 133,236, Dec. 16, 1987, abandoned, which is a continuation of Ser. No. 863,139, May 14, 1986, abandoned.

[30] Foreign Application Priority Data

May 15, 1985 [DE] Fed. Rep. of Germany ....... 3517615

[51] Int. Cl.$^5$ .............................................. C08L 43/04
[52] U.S. Cl. .................................. 525/477; 525/478; 351/160 H
[58] Field of Search ................................ 525/477, 478

[56] References Cited

U.S. PATENT DOCUMENTS

| 3,925,178 | 12/1975 | Gesser et al. | 351/160 H |
| 3,935,342 | 1/1976 | Lim | 525/477 |
| 3,959,105 | 5/1976 | Feneberg et al. | 351/160 H |
| 4,143,949 | 3/1979 | Chen | 351/160 H |
| 4,332,922 | 6/1982 | Kossmehl et al. | 525/478 |

*Primary Examiner*—Lewis T. Jacobs
*Assistant Examiner*—David W. Woodward
*Attorney, Agent, or Firm*—Luther A. R. Hall

[57] ABSTRACT

Hydrophilic silicone rubber article, the surface of which is hydrophilized partly or completely by reaction (equilibration reaction) with organosiloxanes, the organosiloxanes being synthesized by the reaction of SiH-group-containing siloxanes with allyl compounds which contain protected OH groups. These articles are particularly useful as contact lenses and intraocular lenses.

12 Claims, No Drawings

HYDROPHILIC SILICONE RUBBER ARTICLE AND PROCESS FOR ITS PREPARATION

This application is a continuation of application Ser. No. 133,236, filed Dec. 16, 1987, now abandoned, which is a continuation of application Ser. No. 863,139, filed 05/14/86, now abandoned.

BACKGROUND OF THE INVENTION

Polysiloxanes, especially silicone rubber, find use in the most widely differing fields of technology and medicine. Silicone rubber has a high oxygen permeability, for which reason this material would also be expected to be suitable for the manufacture of contact lenses. However, silicone rubber is a hydrophobic material and has therefore not been able to gain acceptance as a contact lens material, for which hydrophobicity causes problems. Various processes are known for hydrophilizing this material (European Patent 0,033,754, German Offenlegungsschrift 3,004,685, U.S. Pat. Nos. 4,143,949 and 3,925,178, French Patent 2,407,232, German Auslegeschrift 2,353,495 and German Auslegeschrift 2,164,805).

From the U.S. Pat. No. 4,332,922, a process is already known for hydrophilizing contact lenses of silicone rubber by providing the surface of the silicone rubber with a hydrophilic layer. This process comprises two steps. In a first step of the process, the silicone rubber is reacted with an oligomeric, SiH-group-containing siloxane in the presence of a catalyst (equilibration reaction) and, in a second step of the process, the equilibrated silicone rubber is subjected either to a reaction with an aqueous base or to a silane addition reaction with compounds containing C=C double bonds. By these means, a silicone rubber with good oxygen permeability is obtained, the surface of which has been made hydrophilic but does not exhibit any increased tendency to form deposits in spite of the high hydrophilicity.

It is an object to the present invention to provide a molded silicone article by means of a process which is an improvement over these known hydrophilizing processes in that only one process step namely only the equilibration reaction, need be carried out in order to make the surface of the molded silicone rubber article hydrophilic.

SUMMARY OF THE INVENTION

By means of the invention, a molded silicone rubber article is provided, the surface of which has a hydrophilic composition, which can be obtained by a one-step equilibration reaction. The equilibration starts with special organosiloxanes, which are synthesized by reacting SiH-group-containing siloxanes with allyl compounds which contain protected OH groups, in the presence of a catalyst, especially hexachloroplatinic acid, and optionally hydrolyzing the product subsequently. Procedurally, the hydrolysis can take place during the conditioning of the molded silicone rubber article, so that no additional process step is required. The equilibration is also carried out in the presence of a catalyst in a solvent, especially in ethers; Lewis acids, especially hexachlorocyclophosphatriene, are suitable as catalysts. The surface composition of the silicone rubber article, so obtained, is hydrophilic, the oxygen permeability of the silicone rubber remaining unimpaired. There is also no tendency to form deposits at the surface of the silicone rubber article.

DETAILED DISCLOSURE

In the equilibration, siloxane mixtures of different molecular weights are brought into molecular equilibrium. As catalysts for this, protons and Lewis acids (W. J. Patnode, C. F. Wilcock, *J. Am. Chem. Soc.* 68, 358 (1946); D. T. Hurd, *J. Am. Chem. Soc.* 77, 2998 (1955); German Patent 831,098) can be used.

The treated molded silicone rubber articles are polydimethysiloxane articles, which have been cross-linked hot or cold, the cold-cross-linked materials still containing some SiH groups.

The equilibration educts used may be linear $\alpha,\omega$-organodimethylsiloxanes (1–4), linear trimethylsilyl-terminated organomethylsiloxanes (7–18), cyclic organomethylsiloxane (20–24), and cyclic diorganosiloxanes (25–26). The equilibration reaction at the surface of the molded silicone rubber article proceeds according to the following reaction scheme:

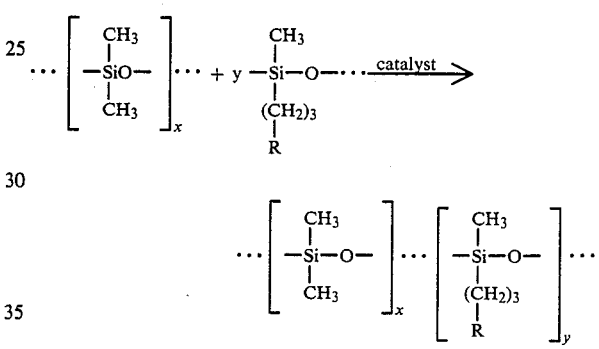

in which x is less than y and R is a hydroxyalkyl group, which confers a hydrophilicity and creates only a light polarity.

The catalysts used preferably are the Lewis acid, 1,1,3,3,5,5-hexachlorocyclotriphosphazene, which gives particularly with good results, and concentrated sulfuric acid.

The following were used as linear equilibration educts: 1,3-bis(3-trimethylsilyloxypropyl)-1,1,3,3-tetramethyldisiloxane (1), 1,3-bis(3-hydroxypropyl)-1,1,3,3-tetramethyldisiloxane (2) (G. Greber, S. Jäger, *Makrom. Chem.* 57, 150 (1962); 1,3-bis(6,7-epoxy-4-oxaheptyl)-1,1,3,3-tetramethyldisiloxane (3) (E. P. Plueddeman, G. Fanger, *J. Am. Chem. Soc.* 81, 2632 (1959); 1,3-bis(6,7-dihydroxy-4-oxaheptyl)-1,1,3,3-tetramethyldisiloxane (4); the addition products of allyloxytrimethylsilane (5) as well as of allyl glycidyl ether (6) with polymethyl hydrogensiloxane of different chain lengths

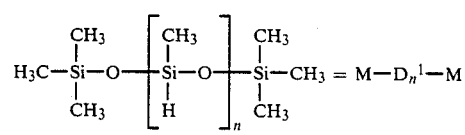

in which n=2, approx. 10, 40 or 50, of the general formula

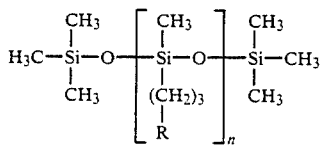

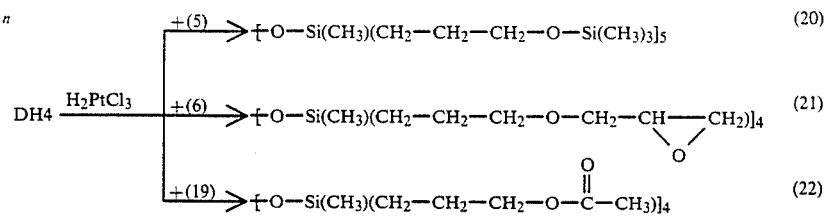

in which R is —O—Si—(CH$_3$)$_3$ or

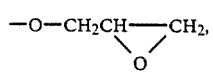

and their hydrolysis products in which R is —OH or —O—CH$_2$—CH(OH)CH$_2$—OH.

In particular, the reactions involve the following:

oxaheptyl)-2,4,6,8-tetramethylcyclotetrasiloxane (21) as well as 2,4,6,8-tetrakis(3-acetoxypropyl)-2,4,6,8-tetramethylcyclotetrasiloxane (22) (M. Phlanz, unpublished secientific work, Free University of Berlin, 1983) were synthesized:

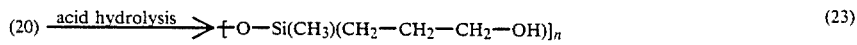

2,4,6,8-Tetrakis-(3-hydroxypropyl)-2,4,6,8-tetramethyl cyclotetrasiloxane (23) and 2,4,6,8-tetrakis(6,7-dihydroxy-4-oxaheptyl)-2,4,6,-8-tetramethylcyclotetrasiloxane (24) were synthesized by hydrolysis of (20) and (21):

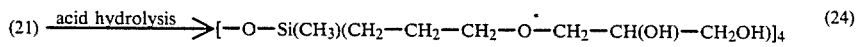

2,2,4,4,6,6,8,8-Octakis(3-acetoxypropyl)-cyclotetrasiloxane (25) and 2,2,4,4,6,6,8,8-octakis-(3-hydroxypropyl)cyclotetrasiloxane (26) are examples of cyclic diorganosiloxanes which can be used a equilibrating materials. Their synthesis is described in detail below (A. Fluthwedel, graduate work, Free University of Berlin, 1984).

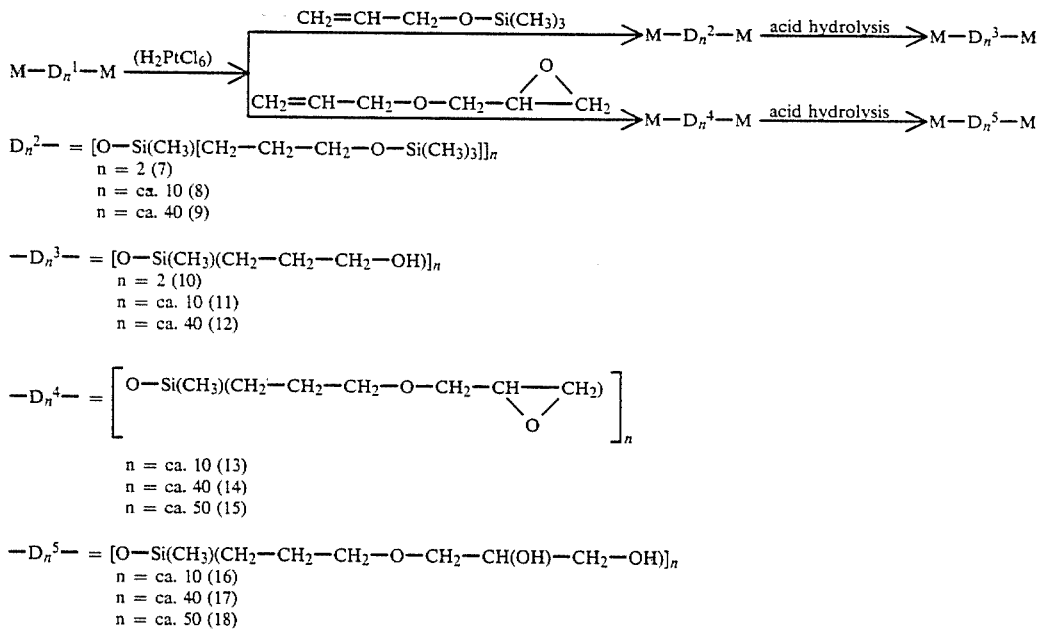

2,4,6,8-Tetramethylcyclotetrasiloxane (R. O. Sauer, W. J. Schreiber, St. D. Brewer, *J. Am. Chem. Soc.* 68, 962 (1946)), referred to as DH4 in the following text, was used as the starting compound for the cyclic organomethylcyclotetrasiloxane as equilibration educts. By addition of (5) or (6) or allyl acetate (19) to DH4, 2,4,6,8-tetrakis(3-trimethylsilyloxypropyl)-2,4,6,8-tetramethylcyclotetrasiloxane (20), 2,4,6,8-tetrakis(6,7-epoxy-4-

Starting from SiCl$_4$ and 2 equivalents of allyl magnesium bromide, diallyldichlorosilane was obtained, to which MBr was added under UV irradiation to form bis(3-bromopropyl)-dichlorosilane. This was added dropwise at $-5°$ to 0° C. to a mixture of ice, sodium bicarbonate and ether, 2,2,4,4,6,6,8,8-octakis(3-bromopropyl)-cyclotetrasiloxane being formed. By boiling this compound with potassium acetate in the presence of glacial acetic acid, 2,2,4,4,6,6,8,8-octakis(3-acetoxypropyl)-cyclotrasiloxane (25) was formed which, on methanolysis in the presence of sodium ethanolate as transesterification catalyst, yielded 2,2,4,4,6,6,8,8-octakis(3-hydroxypropyl)-cyclotetrasiloxane (26).

Diallyldichlorosilane

To a one-liter 3-neck flask with reflux condenser and dropping funnel, 29 g (170 mmoles) of $SiCl_4$ in 150 mL of anhydrous ether were added. Allyl magnesium bromide solution [from 10 g (400 mmoles) of magnesium and 41.5 g (34 mmoles) of allyl bromide in 250 mL of anhydrous ether], filtered through glass wool, was added dropwise, MgBrCl precipitating. After boiling for 1.5 hours under reflux and washing the residue, diallyldichlorosilane was obtained at 56° C. and 16 hPa as a colorless liquid in a 15% yield.

In addition, allyltrichlorosilane (with a boiling point of 24° C. at 16 hPa) was also obtained in a 15% yield.

1H-NMR ($CDCl_3$); 2.1(d, $SrCH_2$—, 2H), 5.2(d, —CH=$CH^1H^2$, 1H), 5.3 (S, CH=$CH^1\underline{H}^2$, 1H), 5.8(m, $CH_2C\underline{H}$=$CH_2$, 1H).

Bis(3-bromopropyl)dichlorosilane

In a 100-milliter quartz Erlenmeyer flask, HBr was passed into 9.5 g (50 mmoles) of the above compound, cooled with ice and water, until samples taken no longer showed the NMR signals of the starting compound (40 minutes). Distillation over a 30 cm rotating band column at 98° C. and 0.01 hPa yielded 14.3 g of (bis(3-bromopropyl)-dichlorosilane (=83%) as a colorless liquid.

IR (Film): 3020 cm$^{-1}$, $\nu CH$ from —$CH_2$—Br: 2970 and 2860 cm$^{-1}$, $\nu CH$; 1440 cm$^{-1}$, $\delta CH$; 1410 cm$^1$, $\delta CH$ from Si—$CH_2$—; 770 and 700 cm$^1$, from C-Br and $CH_2$.

$^1$H-NMR($CDCl_3$): 1.30(q, Si—$C\underline{H}_2$—, 2H), 2.07(m, —$CH_2$—$C\underline{H}_2$—$CH_2$—, 2H), 3.45(t, —$C\underline{H}_2$—Br, 2H).

MS: 219 (99%, M+—$(CH_2)_3Br$), 177 (100%, $SiBrCl_2$).

$C_6H_{12}Br_2Cl_2Si$ (343.0) calculated: C 21.01, H 3.53, found: C 20.64, H 3.62.

2,2,4,4,6,6,8,8-Octakis(3-bromopropyl)-cyclotetrasiloxane

A suspension of 6.7 g (80 mmoles) of ZnO in 55 mL of methyl acetate was added to a 250 mL 3-neck flask with condenser and dropping funnel. The above compound (10 g, 30 mmoles) was dissolved with stirring in 30 mL of methyl acetate and added dropwise. After refluxing for 2 hours, 50 mL of benezene were added. The cooled solution was vacuum filtered and washed twice with 50 mL quantities of water. The organic phase was mixed with about 80 mL of ethanol and dried over sodium sulfate. After the solvent was distilled off, the desired compound remained behind as a highly viscous, colorless oil. Yield: 13.1 g (=22%).

1H-NMR ($DC_3$—CO—$CO_3$): 0.83 (q. Si—$C\underline{H}_2$—, 2H), 1.9 (m, —$CH_2$—$C\underline{H}_2$—$CH_2Br$, 2H), 3.5(t, —$C\underline{H}_2$—Br, 2H).

$C_{24}H_{48}Br_8O_4Si_4$ (1120.3) calculated: C 25.02, H 4.20, found: C 23.83, H 4.17.

2,2,4,4,6,6,8,8-Octakis(3-acetoxypropyl)cyclotetrasiloxane (25)

The above compound (15.3 g, 13 mmoles) was added dropwise to a boiling solution of 20 g (20 mmoles) of potassium acetate in 30 mL of glacial acetic acid. After refluxing for 24 hours, the precipitated KBr was filtered off with vacuum filtration and the glacial acetic acid was distilled off under vacuum. The residue was taken up in ether, the potassium acetate remaining behind. It was washed three times with 25 mL amounts of ether. The combined ether solutions were concentrated at room temperature under vacuum, the desired compound being obtained as a yellowish semi-liquid substance.

1H-NMR ($C_2D_5$—OD); 0.66 (t, Si—$C\underline{H}_2$—, 2H)$_1$ 1.71(m, —$CH_2$—$C\underline{H}_2$—$CH_2$—2H), 2.04(s, —$C\underline{H}_3$, 3H) 4.04(t, —$CH_2$—$C\underline{H}_2$—$CH_2$—O—, 2H)

MS: 884 (23%, M+—$(CH_2)_3$—O—CO—$CH_3$)

$C_{40}H_{72}O_{20}Si_4$ (985.3) calculated: C 48.76, H 7.37, found: C 46.47, H 7.19.

2,2,4,4,6,6,8,8-Octakis(3-hydroxypropyl)-cyclotetrasiloxane (26)

A solution of 0.18 g (7.8 mmoles) of sodium in 20 mL of anhydrous methanol is added to a 100 mL 3-neck flask and the solution of 2.63 g (2.7 mmoles) of the above compound in 10 mL of anhydrous methanol is added dropwise. The methanol/methyl acetate azeotrope formed is distilled off at 58°-62° C. already during the dropwise addition. When the boiling point reached that of pure methanol, the latter was distilled off under vacuum. The residue was taken up in about 15 mL of water and neutralized with dilute HCl. It was evaporated to dryness. The residue was digested with ether, the ether used going into solution. The washed product was taken up in ethanol and, in so doing, freed from NaCl. The solution was then dried with $CaH_2$ and the solvent was distilled off under vacuum. The desired compound was obtained as a colorless solid in a 74% yield.

IR (film): 3600-3100 cm$^{-1}$, $\nu_{CH}$; 2880 cm$^{-1}$, $\nu_{CH}$; cdn 1440 cm$^{-1}$, $\delta_{CH}$ from —$CH_2$—; 1415, $\delta_{CH}$ from Si—$CH_2$; 1150, 1010 cm$^{-1}$, $\nu_{COH}$; 1060 cm (Si—O—Si) for cyclotetrasiloxane, D. N. Kendall, *Applied Infrared Spectroscopy*, Chapman & Hall Ltd., London 1966, page 51).

H-NMR ($CD_3$—OD): 0.64 (m, Si—$C\underline{H}_2$, 2H), 1.64 (m, Si—$Ch_2$—$C\underline{H}_2$—, 2H), 3.52(t, —$C\underline{H}_2OH$, 2H ), 4.85(s, —OH, 1$\underline{H}$).

$C_{23}H_{56})O_{12}Si_4$ (649.0) calculated: C 44.47, H 8.70, found: C 43.08, H. 7.98.

Ethers, which are inert to the equilibration educts and the silicone rubber materials are suitable as solvents for the equilibration of the molded silicone rubber articles. The equilibration educts are dissolved in the solvent in question. After addition of the equilibrating catalyst, the molded article is stirred slowly in the solution at temperatures of 80° to 110° C. After the equilibration, the molded article is treated further depending on the equilibration educt used. When the equilibration agents with protected hydroxy groups are used, the protecting groups can be split off with 5% mineral acid or the oxirane ring can be opened up after the equilibration reaction. After a 24-hour hydration, the molded silicone rubber articles were dried or conditioned.

Experimental Section

The synthesis of the equilibration educts (1) to (4), (7), (10), as well as (20) and (23) is described in co-pending patent application, filed concurrently herewith under the title "Modified Silicone Rubber and its Use as a Material for Optical Lenses, and Optical Lenses Made from This Material".

Addition of Allyl Compounds to Polymethylhydrogensiloxanes

Trimethylsilyl-terminated polymethylhydrogensiloxane (10 mmoles) was mixed with 200 mL of dioxane and heated to the boiling temperature. After addition of 2 mL of a 1 weight percent solution of hexachloroplatinic acid in diethylene glycol dimethyl ether, the allyl compound was added dropwise with stirring in an amount equivalent to the —O—Si(CH$_3$)H present. When the reaction mixture had been stirred under reflux for 6 hours, the solution was concentrated and the residual solvent and the unconsumed addition components were removed at 70° C. and 0.1–0.5 hPa. The insoluble portions were subsequently removed by filtration.

α-(Trimethyl)-ω-(trimethylsilyloxy)polymethyl(3-trimethylsilyloxpropyl)siloxane (8) (n approx. 10).

From 7.6 g (10 mmoles of polymethylhydrogensiloxane (m-D$_n^1$-M) (n approx. 10; Baysilon oil MH 4) and 13.0 g (100 mmoles) allyloxytrimethylsilane.
Yield: 19.4 g (94.2%); n$_D^{20}$: 1.4350
C$_{76}$H$_{198}$O$_{21}$Si$_{22}$ (2066.4) calculated: C 44.18, H 9.66, found: C 36.98, H 8.21.
Baysilon is a trademark of Bayer AG (Leverkusen, Germany) for a series of silicone oils.

α-(Trimethylsilyl)-ω-(trimethylsilyloxy)poly[methyl-(3-trimethylsilyloxpropyl)siloxane] (9), (n approx. 40)

From 25.6 g (10 mmoles) polymethylhydrogensiloxane M-D$_n^1$-M (n approx. 40: Baysilon oil MH 15) and 52.0 g (400 mmoles) allyloxytrimethylsilane. Yield: 73.7 g (95%); n$_D^{20}$: 1.4370.
C$_{286}$H$_{738}$O$_{81}$Si$_{82}$ (7778.4) calculated: C 44.15, H 9.56, found: C 40.69, H 8.59.

α-(Trimethylsily)-ω-(trimethylsilyloxy)poly[methyl-(6,7-epoxy-4-oxaheptyl)siloxane] (13), (n approx. 10)

From 7.6 g (10 mmoles) polymethylhydrogensiloxane M-D$_n^1$-M (n approx. 10; Baysilon oil MH 4) and 11.4 g (100 mmoles) allyl glycidyl ether.
Yield: 18.0 g (94.7%); n$_D^{20}$: 1.4528.
C$_{76}$H$_{158}$O$_{31}$Si$_{12}$ (1905.2) calculated: C 47.91, H 8.36, found: C 47.41, H 8.29.

α-trimethylsily)-ω-(trimethylsilyloxy)poly[methyl-(6,7-epoxy-4-oxaheptyl)siloxane] (14), (n approx. 40)

From 25.6 g (10 mmoles) polymethylhydrogensiloxane M-D$_n^1$-M (n approx. 40; Baysilon oil MH 15) and 45.6 g (400 mmoles) allyl glycidyl ether.
Yield: 67.1 g (94.2%); n$_D^{20}$: 1.4611.
C$_{286}$H$_{578}$O$_{121}$Si$_{42}$ (7133.4) calculated: C 48.16, H 8.17, found: C 45.65, H 8.00.

α-(Trimethylsilyl)-ω-(trimethylsilyloxy)poly[methyl-(6,7-epoxy-4-oxaheptyl)siloxane] (15), (n approx. 50)

From 31.6 g (10 mmoles) polymethylhydrogensiloxane M-D$_n^1$-M (n approx. 50; Baysilon oil MH 20/30) and 57.0 g (500 mmoles) allyl glycidyl ether.
Yield: 84.4 g (95.2%); n$_D^{20}$: k, 1.4622.
C$_{356}$H$_{718}$O$_{151}$Si$_{52}$ (8876.2) calculated: C 48.17, H 8.15, found: C 44.83, H 7.94.

Hydrolysis of Compounds (8), (9) and (13)–(15)

The siloxane compounds described above (5 mmoles) were taken up in 100 mL of chloroform and stirred for 12 hours at room temperature with 200 mL of a 5 weight percent hydrochloric acid solution. After the addition of 200 mL of chloroform, stirring was continued for a further 30 minutes. The mixture was then transferred to a separating funnel and the aqueous phase was removed. The organic phase was washed until neutral, dried over sodium sulfate and concentrated in a rotary evaporator. The remaining solvent and trimethylsilanol or hexamethyldisiloxane were removed under a vacuum of 0.1–0.5 hPa, the temperature being increased to 70° C. towards the end of the distillation.

α-(Trimethylsilyl)-ω-(trimethylsilyloxy)poly[methyl(3-hydroxypropyl)siloxane] (11), (n approx. 10)

From 10.3 g (5 mmoles) (8).
Yield: 6.6 g (98.5%); n$_D^{20}$: 1.4398.
C$_{46}$H$_{118}$O$_{21}$Si$_{12}$ (1344.5) calculated: C 41.09, H 8.85, found: C 35.78, H 8.28.

α-(Trimethylsilyl)-ω-(trimethylsilyloxy)poly[methyl-3-hydroxypropyl)siloxane] (12), (n approx. 40)

From 38.0 g (5 mmoles) of compound (9).
Yield: 24.0 g (98.0%); n$_D^{20}$: 1.4420.
C$_{166}$H$_{418}$O$_{81}$Si$_{42}$ (4890.9) calculated: C 40.77, H 8.61, found: C 36.96, H 8.63.

α-(Trimethylsilyl)-ω-(trimethylsilyloxy)poly[methyl(6,7-dihydroxy-4-oxaheptyl)siloxane] (16), (n approx. 10)

From 9.5 g (5 mmoles) of compound (13).
Yield 9.4 g (90.4%); n$_D^{20}$: 1.4678.
C$_{76}$H$_{187}$O$_{41}$Si$_{12}$ (2085.3) calculated: C 43.77, H 8.60, found: C 38.90, H 7.33.

α-(Trimethylsilyl)-ω-(trimethylsilyloxy)poly[methyl(6,7-dihydroxy-4-oxaheptyl)siloxane] (17), (in approx. 40)

From 35.6 g (5 mmoles) of compound (14).
Yield: 38.0 g (96.0%); n$_D^{20}$: 1.475.
C$_{286}$H$_{658}$O$_{161}$Si$_{42}$ (7854.0) calculated: C 43.74, H 8.44, found: C 44.71, H 7.98.

α-(Trimethylsilyl)-ω-(trimethylsilyloxy)polymethyl-silyloxy)poly[methyl-(5,7-dihydroxy-4-oxaheptyl)siloxane] (18), (n aprox. 50)

From 44.3 g (5 mmoles) of compound (15).
Yield: 45.4 g (93.0%); n$_D^{20}$: 1.4729.
C$_{356}$H$_{818}$O$_{201}$Si$_{52}$ (9776.9) calculated: C 43.73, H 8.43, found: C 41.12, H 7.70.

2,4,6,8-Tetrakis(6,7-epoxy-4-oxaheptyl)-2,4,6,8-tetramethylcyclotetrasiloxane (21)

Allyl glycidyl ether (57.1 g, 0.5 moles) was added to a 250 mL 3-neck flask, equipped with a stirrer, dropping funnel, internal thermometer and condenser, and heated to 100° C. After the addition of 1 mL of a 1 weight percent solution of hexachloroplatinic acid in diethylene glycol dimethyl ether, 24.0 g (0.1 moles) of 2,4,6,8-tetramethylcyclotetrasiloxane were added very rapidly with vigorous stirring, the internal temperature rising to 195° C. After the addition of 2,4,6,8-tetramethylcyclotetrasiloxane, stirring was continued until the temperature of the reaction product had dropped to 130° C. Unreacted portions of the allyl glycidyl ether and 2,4,6,8-tetramethylcyclotetrasiloxane were removed by stirring the reaction mixture at 60°–70° C. at a vacuum of 0.1 hPa, produced by an oil pump. The slightly yellowish crude product (77.8%), n$_D^{20}$: 1.4633, was subjected to a fractional vacuum distillation using a packed column. The compound (21) distilled at about 335° C.

and 1 hPa as a clear, viscous liquid, the greater portion polymerizing. $n_D^{20}$: 1,4668.

IR(Film): 3060(m; OCH), 1110 (s; C—O—C) and 1060 cm$^{-1}$ (vs; Si—O—Si

MS. m/z 333 (M—$C_{14}H_{28}O_7Si_2$)+ (4) 31B (M—$C_{14}H_{28}O_7Si_2$, —$CH_3$)+ (4); 202 ($C_7H_{14}O_3Si_2$)+ (21); 101 ($CH_2$—$CH_2$—O—$CH_2$—CH—$CH_2$—O)+ (41); 85 ($C_2H_5OSi_2$)+ (100).

$^1$H NMR (CDCl$_3$): δ=0,08 (s; Si—CH$_3$, 12H), 0.42 (M; Si—$\overline{CH_2}$—, 8H), 1.50 (m; —CH$_2$—CH$_2$—CH$_2$, 8H), 2.50 (q; —CH$_2$—CH—$\overline{CH_2}$—O, 4H), 2.78 (—CH$_2$—$\overline{CH}$—CH$_2$—O, 4H), 3.10 (m; —CH$_2$—CH—$\overline{CH_2}$—O, 4H), 3.34 (m; —$\overline{CH_2}$—CH—CH$_2$—O, 4H), 3.40 (m; —O—$\overline{CH_2}$—CH, 4H), 3.66 (g; —O—CH$_2$—$\overline{CH}$, 4H)

$C_{28}H_{56}O_{12}Si_4$ (697.1) calculated: C 48.24, H 8.10, found: C 47.47, H 8.03.

2,4,6,8-Tetrakis(6,7-dihydroxy-4-oxaheptyl)-2,4,6,8-tetramethylcylcotetrasiloxane (24)

To 14 g (20 mmoles) of compound (21), 50 mL of a 5 weight percent hydrochloric acid solution was added and the mixture was stirred at room temperature for 24 hours and then transferred to a separating funnel. Ether (100 mL was added in order to accelerate the separation of the organic from the aqueous phase. After the two phases were separated, the aqueous phase was extracted twice with 50 mL amounts of ether. The combined ether phases were washed with distilled water to remove the acid and then dried over sodium sulfate. The bulk of the solvent was removed in a rotary evaporator and the remainder under a vacuum of 0.3 hPa with stirring using an oil pump. After vacuum filtering through a G-4 glass frit, the compound (24) was obtained as a viscous, clear liquid.

Yield: 14.8 g (96.2%); $n_D^{20}$: 1.4705.

IR(Film): 3450 (m; —OH, 1115 (vs; C—O—C) and 1085 cm$^{-1}$ (vs; Si—O—Si).

MS: m/z 384 (M—$C_{14}H_{32}O_8Si_2$)+ (6); 369(m—$C_{14}H_{32}O_8Si_2$,—$CH_3$)+ (8); 192($C_7H_{17}O_4Si$)+ (30); 133 ($C_6H_{13}O_3$)+ (100).

$^1$H NMR (CDCl$_3$): δ=0.08 (s; Si—CH$_3$, 12H), 0.50 (m; Si—$\overline{CH_2}$—, 8H), 1.58 (m; —CH$_2$—$\overline{CH_2}$—CH$_2$—; 8H), 3.0 (s; —CH—OH, 4H), 3.49 (d; —O—$\overline{CH_2}$—CH, 8H), 3.54 (m; —$\overline{CH_2OH}$, 4H), 3.56 (m; —CH$_2$—OH, 8H), 3.94 (m; —$\overline{CH}$—OH, 4H).

$C_{28}H_{64}O_{16}Si_4$ (769.6) calculated: C 43.72, H 8.39, found: C 43.30, H 8.12.

2,4,6,8-Tetrakis(3-acetoxypropyl)-2,4,6,8-tetramethyl-cyclotetrasiloxane (22)

Allyl acetate (40 g, 0.4 mmoles) and 1 mL of a 1 weight percent hexachloroplatinic acid solution in diethylene glycol diethyl ether were heated to 50° C. DH4 (24 g, 0.1 moles) was now added dropwise, the temperature rising to 110° C. At the end of the addition, stirring was continued for a further 20 hours at 60° C. Subsequently, the reaction soltuion was distilled under vacuum, the compound (22) distilling over as a clear liquid at 122°-125° C. and 1.6 hPa.

Yield: 64 g (100%); $n_D^{20}$: 1.4120.

IR(Film): 1745 (vs; C=O), 1080(vs; Si—O—Si) and 805 cm$^{-1}$ (Si—CH)

MS: m/z 641 (M+) (2); 439 (M—$2C_5H_9O_2$)+ (81); 338 (M—$3C_5H_9O_2$)+ (75); 43($CH_3CO$)+ (100).

$^1$H NMR (CCl$_4$): δ=0.13 (s; Si—CH$_3$, 12H), 0.55 (m; Si—$\overline{CH_2}$—, 8H), 1.60(m; —CH$_2$—$\overline{CH_2}$—CH$_2$—, 8H), 20 (s; CH$_3$—CO—, 12H), 4.00 (t; —$\overline{CH_2}$—O—, 8H).

$C_{24}H_{48}O_{12}Si_4$ (641.0) calculated: C 44.92, H 7.50, found: C 44.47, H 7.35.

General Procedure for Equilibrating Molded Silicone Articles (F1)-(F-18)

Extracted, molded silicone rubber articles in film form, cross linked hot or cold, were stirred slowly in an organic ether with the equilibrating reagent and the catalyst. The solvents used, the equilibration components and their concentration, the catalyst concentration, the equilibration time and the reaction temperature are listed in the following Table 1. Table 1 contains selected examples of the preparation of hydrophilic films, which have a high oxygen permeability. At the end of the reaction, the films were rinsed with ether/acetone, stirred for 24 hours at room temperature in distilled water and subsequently dried at 80° C.

When a compound with protected OH groups (such as compound (21)) was used as equilibrating reagent, the procedure described above is followed first. After the rinsing with ether/acetone, the films, so treated, were then rinsed briefly with distilled water and then stirred for 24 hours at room temperature with a 5 weight percent hydrochloric acid solution, subsequently rinsed with distilled water, washed once again for 24 hours at room temperature and then dried at 80° C.

Discussion of the Results

Spectra of the Linear Equilibrating Reagents (7)-(18)

The IR spectra compounds (7)-(18) show the oscillations at 1260 cm$^{-1}$, (δ; Si—CH$_3$), 1050 cm$^{-1}$ ($\nu$; Si—O—Si) and 800 cm$^{-1}$ ($\nu_{as}$; Si—CH$_3$), which are typical for the siloxane structure. Contrary to the starting materials, the valence oscillation band of the Si—H bond at 2170 cm$^{-1}$ is no longer visible; instead, a larger number of bands is to be found in the 2800-3000 cm$^{-1}$ region, which can be assigned to the symmetric and asymmetric valence oscillations of the methylene group and to the symmetric valence oscillations of the methyl group. The hydrolyzed addition products (11), (12), (16), (17) and (18) show the broad absorption bands of the OH valence oscillations at 3400 cm$^{-1}$.

$^1$H NMR spectra show the expected signals for the siloxane portions at δ approx. 0.1 ppm. The signals for the protons of the organic radicals show the expected chemical shifts.

FMIR-IR Spectra of the Equilibrated Films

N. J. Harrick (*J. Phys. Chem.* 64, 1110 (1960)) and J. Fahrenfort (*Spectrochem. Acta* 17, 698 (1961)) describe the so-called ATR IR recording techniques (Attenuated Total Reflection) for strongly absorbing materials. With a special sample-crystal arrangement, there is a multiple reflection, the method being referred to as FMIR-IR spectroscopy (Frustrated Multiple Internal Reflection). FMIR-IR spectra and transmission spectra are comparable with respect to the position of the bands. The wave number region from 2700 to 3800 cm$^{-1}$ was used to evaluate the equilibrated films. The nature of the surface of the samples can still be compared well here, as the depth of penetration increases only at longer wave lengths. In the 2700-3800 cm$^{-1}$ region, the untreated films show two bands, which must be assigned to the C-H oscillations of the methyl group ($_s$; 2960 cm$^{-1}$, $_{as}$; 2900 cm$^{-1}$).

The spectra of the equilibrated films show OH valence bands of different intensities in the 3300–3400 cm$^{-1}$ region. Moveover, the symmetrical oscillations of the additional —CH$_2$ fragment can be seen at about 2880 cm$^{-1}$. When linear siloxanes were used as equilibration educts, the band intensities were higher for short-chain compounds (1)–(6) than for the siloxanes (7)–(18). Of the (7)–(18) siloxanes, good band intensities could be achieved only with siloxane (8). The FMIR-IR spectra of the remaining treated films were hardly different from the spectrum of the untreated sample. The greatest OH band intensities were achieved when the cyclic tetrasiloxanes were used. In this case, the films, which had been equilibrated for 4 hours at 100° C. and a catalyst concentration of 1 weight percent relative to the amount of siloxane used, showed the most intensive OH— and —CH$_2$ bands.

The Oxygen Permeability of the Equilibrated Silicone Rubber Films

The oxygen permeability of the equilibrated silicone rubber films was determined with an oxygen flux meter of the Versatae setup. The oxygen permeability of the equilibrated films was not significantly different from that of an untreated film (F-0). Since the oxygen permeability of the silicone rubber material depends on the thickness (F. J. Haberich, *Referatesammlung der 12. Aschaffenburger Kontaktlinsentagung*, vom 22. bis 24. März 1979 (Collection of Papers of the 12th Aschaffenburg Contact Lens meeting from Mar. 22 to Mar. 24, 1979), page 16), in addition to the oxygen permeability P, the transmissivity T and the oxygen flux J are given in Table 2. The films, equilibrated with compounds (7)–(18), showed no or only slight changes in the FMIR-IR spectra; their oxygen permeability was therefore not measured.

The Contact Angle of the Equilibrated Silicone Rubber Films

The contact angle is a characteristic parameter of the wettability of silicone rubber films. Untreated silicone films have contact angles of about 85°. *Kontaktlinsenchemie* (Contact Lens Chemistry), Median Verlag Heidelberg, 1980, page 84). The contact angles of the silicone rubber films, selected in Table 2, all have significantly smaller values; that is, they show relatively good wettability. This is necessary for materials which are to be used for contact lenses.

The Water Content of the Equilibrated Silicone Rubber Films

The water content was determined by the method of G. Kossmehl, N. Klaus and H. Schäfer (*Angew. Makromol. Chem.* 123/124, 241 (1984)). The silicone material, hydrophilized only at the surface, has only the low water absorption that is to be expected from a silicone rubber. With two exceptions, the values for the films selected in Table 2 are less than 2 weight percent.

Suitability as a Contact Lens Material

The synthesis of organosiloxanes with terminal OH groups and their equilibration with conventional, commercial silicone rubber films according to the process described above entailed no significant decrease in the oxygen permeability of the silicone rubber films. The values measured for the oxygen permeation permit a transport of oxygen through the material, which is more than adequate for its use as a contact lens material. The high hydrophobicity of the silicone material could be lowered by the surface modification to such an extent that the surface of the material was now hydrophilic. The water content of the silicone rubber films was similar to that of untreated silicone material. The silicone rubber films, so treated, remain transparent and are very suitable as a contact lens material.

TABLE 1

Details of the Preparation of Selected Silicone Rubber Films by Equilibrating at the Film Surface

| Film | Equilibrating Reagent | Weight % | Solvent | (c) Catalyst in Weight % | t/h | t/°C. |
|---|---|---|---|---|---|---|
| F 1  | 2  | 10 | EGDM$^a$  | 1.0 | 12 | 100 |
| F 2  | 2  | 10 | "         | 1.0 | 24 | 100 |
| F 3  | .2 | 10 | "         | 1.0 | 48 | 100 |
| F 4  | 4  | 20 | DEGDM$^b$ | 0.4 | 24 | 100 |
| F 5  | 4  | 20 | "         | 0.4 | 2  | 100 |
| F 6  | 4  | 20 | "         | 0.4 | 4  | 100 |
| F 7  | 23 | 20 | "         | 0.4 | 2  | 100 |
| F 8  | 23 | 20 | "         | 0.4 | 4  | 100 |
| F 9  | 23 | 20 | "         | 0.4 | 24 | 100 |
| F 10 | 23 | 10 | "         | 0.4 | 17 | 110 |
| F 11 | 23 | 10 | "         | 0.4 | 20 | 110 |
| F 12 | 23 | 10 | "         | 0.4 | 24 | 110 |
| F 13 | 23 | 10 | "         | 0.4 | 48 | 110 |
| F 14 | 23 | 20 | "         | 0.4 | 24 | 110 |
| F 15 | 23 | 20 | "         | 0.4 | 28 | 110 |
| F 16 | 24 | 5  | Dioxane   | 1.0 | 1  | 100 |
| F 17 | 24 | 5  | "         | 1.0 | 4  | 100 |
| F 18 | 24 | 5  | "         | 1.0 | 24 | 100 |
| F 19 | 22 | 50 | DEGDM     | 0.5 | 48 | 120 |

$^a$Ethylene glycol dimethyl ether
$^b$Diethylene glycol dimethyl ether
$^c$Hexachlorocyclotriphosphazene

TABLE 2

Oxygen Permeability, Contact Angle and Water Content of the Equilibrated Silicone Rubber Films

| Film | Film Thickness in mm | Oxygen Permeability P·10$^{11(a)}$ | Oxygen Permeability T·10$^{9(b)}$ | Oxygen Permeability J$^{(c)}$ | Contact Angle in Degrees | Water Content in Weight |
|---|---|---|---|---|---|---|
| F 0  |       |      |      |     |    | 1.0 |
| F 1  | 0.308 | 37.0 | 12.0 | 6.7 | 25 | 1.0 |
| F 2  | 0.312 | 34.6 | 11.1 | 6.2 | 26 | 1.5 |
| F 3  | 0.325 | 33.8 | 10.4 | 5.8 | 28 | 0.3 |
| F 4  | 0.255 | 29.7 | 11.6 | 6.5 | 30 | 3.4 |
| F 5  | 0.300 | 31.2 | 10.4 | 5.8 | 24 | 0.5 |
| F 6  | 0.338 | 35.5 | 10.5 | 5.9 | 27 | 1.9 |
| F 7  | 0.227 | 25.9 | 11.4 | 6.4 | 30 | 1.5 |
| F 8  | 0.235 | 24.9 | 10.6 | 5.9 | 36 | 0.9 |
| F 9  | 0.268 | 28.5 | 10.6 | 5.9 | 33 | 1.9 |
| F 10 | 0.268 | 32.7 | 12.2 | 6.8 | 30 | 1.4 |
| F 11 | 0.282 | 32.6 | 11.6 | 6.5 | 36 | 1.2 |
| F 12 | 0.253 | 26.6 | 10.5 | 5.9 | 32 | 2.4 |
| F 13 | 0.250 | 26.9 | 10.8 | 6.0 | 27 | 1.3 |
| F 14 | 0.282 | 28.2 | 10.0 | 5.6 | 21 | 0.2 |
| F 15 | 0.281 | 34.0 | 12.1 | 6.8 | 28 | 1.7 |
| F 16 |       |      |      |     | 39 | 0.8 |
| F 17 |       |      |      |     | 48 | 0.1 |
| F 18 |       |      |      |     | 43 | 0.6 |
| F 19 | 0.648 | 35.0 | 6.0  | 3.4 | 22 | 3.3 |

$^{(a)}$P in mL O$_2$ cm$^2$/mL × (mm Hg) × s
$^{(b)}$T in mL O$_2$/cm$^2$ × (mm Hg) × s
$^{(c)}$J in L/cm$^2$ × h

The silicone rubber articles, especially the contact lenses or intraoccular lenses, can subsequently also be subjected a surface treatment by plasma polymerization with the help of a plasma discharge. The plasma discharge is carried out in an atmosphere which contains the compounds present in the equilibration reaction. The plasma discharge can be produced with direct current or in an alternating electromagnetic field. Preferably the plasma is discharged with an amperage of 5 to 500 MA and at a voltage ranging from 100 to 1000 volts. During the plasma polymerization, there is a vacuum of $10^{-1}$ to $10^{-3}$ torr in the reaction vessel.

We claim:

1. An improved process for hydrophilizing the surface of a molded silicone rubber article in which the silicone rubber at its surface is reacted in a catalyzed equilibration reaction with an organosiloxane, wherein the improvement comprises using as the organosiloxane a preformed organosiloxane containing hydroxyalkyl or protected hydroxyalkyl moieties, synthesized by reacting a siloxane containing a Si—H group with an allyloxy compound in the presence of a catalyst.

2. A process according to claim 1 which additionally comprises hydrolyzing the equilibrated reaction product formed by the process of claim 1.

3. A process according to claim 1 wherein the silicone rubber article is a contact lens.

4. A process according to claim 1 in which the organosiloxane is selected from the group consisting of linear α,ω-organodimethylsiloxane, linear trimethysilylterminated organomethylsiloxanes, cyclic organomethylsiloxanes, cyclic diorganosiloxanes and mixtures thereof.

5. A process according to claim 4, in which the organosiloxane is an α,ω-organodimethylsiloxane selected from the group consisting of 1,3-bis(3-trimethylsilyloxypropyl)-1,1,3,3,-tetramethyl-disoloxane, 1,3-bis-(3-hydroxypropyl)-1,1,3,3-tetramethyldisiloxane, 3,5-bis(3-trimethylsilyloxypropyl)-1,1,1,3,5,7,7,7-octamethyltetrasiloxane, 3,5-bis(3-hydroxypropyl)-1,1,1,3,5,7,7,7-octamethyltetrasiloxane, 1,3-bis-(6,7-epoxy-4-oxaheptyl)-1,1,3,3-tetramethyldisiloxane, 1,3-bis(6,7-dihydroxy-5-oxaheptyl)-1,1,3,3-tetramethyl-disiloxane, and mixtures thereof.

6. A process according to claim 4 in which the organosiloxane is a silyl-terminated organomethylsiloxane addition product of the general formula

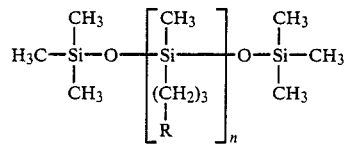

wherein R is —O—Si(CH$_3$)$_3$ or

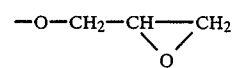

obtained from allyloxytrimethylsilane or allyl glycidyl ether and polymethylhydrogensiloxanes of different chain length and having the formula

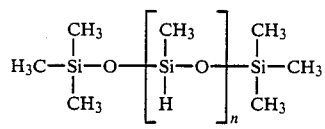

wherein n=2 or from about 10 to about 50, or their hydrolysis products in which R is —OH or —O—CH$_2$—CH(OH)—CH$_2$—OH.

7. A process according to claim 4 in which the organosiloxane is a cyclic organomethylsiloxane or cyclic diorganosiloxane selected from the group consisting of 2,4,6,8-tetrakis(3-trimethylsilyloxypropyl)-2,4,6,8-tetramethylcyclotetrasiloxane, 2,4,6,8-tetrakis-(6,7-epoxy-4-oxaheptyl)-2,4,6,8-tetramethylcylcotetrasiloxane, 2,4,6,8-tetrakis(3-acetoxypropyl)-2,4,6,8-tetramethylcyclotetrasiloxane, 2,4,6,8-tetrakis(3-hydroxypropyl)-2,4,6,8-tetramethylcyclotetrasiloxane, 2,4,6,8-tetrakis(6,7-dihydroxy-4-oxaheptyl)-2,4,6,8-tetramethylcyclotetrasiloxane, 2,2,4,4,6,6,8,8-octakis-(3-acetoxypropyl)cyclotetrasiloxane, 2,2,4,4,6,6,8,8-octakis(3-hydroxypropyl)cyclotetrasiloxane and mixtures thereof.

8. A process according to claim 1, wherein a Lewis acid or concentrated sulfuric acid is used as equilibration catalyst.

9. A process according to claim 8, wherein hexachlorocyclotriphosphazene is used as Lewis acid.

10. A process according to claim 8 wherein the equilibration reaction is carried out in an ether as solvent.

11. A process according to claim 1, wherein the SiH-group-containing siloxane is reacted with the allyl compound in the presence of hexachloroplatinic acid as catalyst.

12. A process according to claim 1 wherein polydimethylsiloxane is used as the silicone rubber.

* * * * *